United States Patent [19]

Mitsukuchi et al.

[11] Patent Number: 4,620,363

[45] Date of Patent: Nov. 4, 1986

[54] COMPOSITE MACHINING LATHE

[75] Inventors: Yukio Mitsukuchi, Konan; Sakae Hatano, Aichi, both of Japan

[73] Assignee: Yamazoki Machinery Works, Ltd., Aichi, Japan

[21] Appl. No.: 665,347

[22] Filed: Oct. 26, 1984

[30] Foreign Application Priority Data

Oct. 28, 1983 [JP] Japan ............................ 58-203412
Nov. 25, 1983 [JP] Japan ............................ 58-221863

[51] Int. Cl.$^4$ .......................................... B23Q 3/155
[52] U.S. Cl. ............................................ 29/568
[58] Field of Search ............... 29/26 A, 568; 408/35, 408/31

[56] References Cited

U.S. PATENT DOCUMENTS

| 3,466,739 | 9/1969 | Harman | 29/568 |
| 3,635,569 | 1/1972 | Sato et al. | 408/35 |
| 3,867,756 | 2/1975 | Koch et al. | 29/568 |
| 4,196,501 | 4/1980 | Shimijiri et al. | 29/568 |

FOREIGN PATENT DOCUMENTS

| 3139152 | 5/1982 | Fed. Rep. of Germany | 29/568 |
| 157934 | 12/1981 | Japan | 29/568 |
| 163857 | 12/1981 | Japan | 29/568 |
| 657954 | 4/1979 | U.S.S.R. | 29/568 |

*Primary Examiner*—Gil Weidenfeld
*Assistant Examiner*—Daniel W. Howell
*Attorney, Agent, or Firm*—Cushman, Darby and Cushman

[57] ABSTRACT

A composite machining lathe having a tool holder base movable in the direction of the axis of the spindle and a tool magazine. The tool magazine has a continuous elongated flexible tool carrier adapted to run along a path having a curved section. A plurality of tools are carried by the tool carrier in such a manner that the tools on the portion of the tool carrier in the curved section of the path are selectively engageable with a head bore formed in the tool holder base. The tool magazine is mounted such as to be movable together with the tool holder base in synchronism in the direction of axis of the spindle and in the direction perpendicular to the axis of the spindle. The tool holder base is mounted in such a manner that it is movable to and from a retracted position relatively to the tool magazine. Tool holding means are provided on the tool holder base for holding the tools on the tool carrier. The selected tool to be used in the machining is moved to the curved section of the path of the tool carrier where the distance between adjacent tools is increased to avoid any interference between adjacent tools, while other tools are densely arranged on the straight portion of the tool carrier. The number of tools employed can be increased by the use of a supplementary tool magazine storing a number of tools.

6 Claims, 14 Drawing Figures

Fig. 10
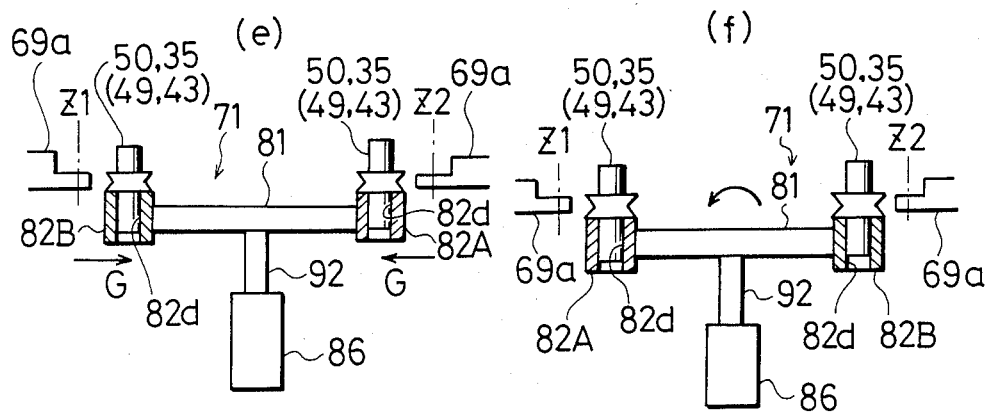
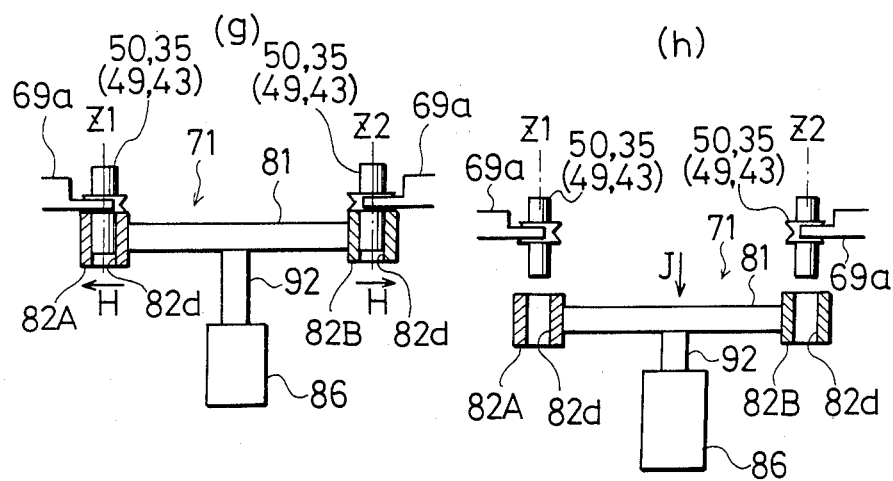

COMPOSITE MACHINING LATHE

BACKGROUND OF THE INVENTION

The present invention relates to a composite machining lathe having a tool magazine storing a plurality of different tools and adapted to successively conduct various machinings by selectively changing and using these tools.

To comply with the current demand for diversification of machining of machine parts or the like, lathes known as composite machining lathes, capable of performing various machining tasks through selective use of a plurality of tools, have been developed and put into practical use.

In these lathes, the various types of machining are successively conducted through sequential exchange of a variety of tools. To handle diversified machining tasks, therefore, it is necessary to prepare a large number of tools in a ready-to-use fashion.

Generally, the composite lathes of the type described can be categorized into turret-type lathes having a turret carrying a multiplicity of tools and adapted to be indexed to bring one of the tools to the machining position, and ATC arm-type lathe having an automatic tool exchanger equipped with an ATC (Automatic Tool Changing) arm adapted to deliver tools from a tool holder base to a tool magazine separate from the tool holder base and vice versa thus conducting a tool exchange.

The turret-type composite lathes suffer from a disadvantage in that the number of the tools which can be held by the turret is limited undesirably. Namely, if the number of the tools is increased unlimitedly, an interference tends to occur between adjacent tools or between the tools and the work. For mounting as many tools as possible on a turret having a given size, much time and skill will be required for attaining such a tool layout as to avoid the interference mentioned above.

On the other hand, the ATC arm-type composite lathes requires a considerably long time for the transfer of tools between the tool magazine and the tool holder base for the tool exchange by the ATC arm, although the problem of interference and the limitation of number of the tools is not so severe in this type of lathe as in the turet-type. In addition, the arrangement around the tool holder base is complicated and becomes large in size because it is necessary to provide a mechanism for driving the ATC arm. Furthermore, a large driving power is required for driving the tool holder base and other movable parts. In consequence, the lathe as a whole becomes complicated and large in size.

Moreover, both types of composite machining lathe involve a common disadvantage in that, when a tool which is hot carried by the turret or the tool magazine is to be used, the operator has to manually set the new tool on the turret or the tool magazine. This manual work is quite troublesome and time-consuming. Thus, the operator is heavily burdened and preparation time is impractically prolonged for the setting of tools particularly in the case of a large-lot and small-quantity production which is often demanded in the current style of production.

It would be possible to obviate these problems by using a turret or magazine of increased size so as to permit the mounting of as many tools as possible. Such turret or tool magazine having an increased size, however, inconveniently prolongs the time required for the tool indexing or exchange, i.e., for the tool selection, resulting in a prolongation of loss time.

SUMMARY OF THE INVENTION

Accordingly, an object of the invention is to provide a composite machining tool capable of mounting many tools in a compact manner without causing any interference and capable of shortening the time required for the tool exchange.

Another object of the invention is to provide a composite machining lathe having a tool storage means capable of storing, despite a rather small size, a large number of tools, thus eliminating the operator's manual work for resetting the tools.

To this end, according to one preferred form of the invention, there is provided a composite machining lathe comprising: a continuous elongated flexible tool carrier in the tool magazine and adapted to run along a path having a curved section; a plurality of tools carried by the tool carrier in such a manner that the tools on the portion of the tool carrier in the curved section of the path are selectively engageable with a head bore formed in the tool holder base; means for mounting the tool magazine such that the tool magazine is movable together with the tool holder base in synchronism in the direction of axis of the spindle and in the direction perpendicular to the axis of the spindle; means for mounting the tool holder base in such a manner that the tool holder base is movable to and from a retracted position relatively to the tool magazine; and tool holding means provided on the tool holder base and capable of holding the tools on the tool carrier.

According to another preferred form of the invention, there is provided a composite machining lathe of the type comprising: a continuous elongated flexible tool carrier in the tool magazine and adapted to run along a path having a curved section; a plurality of tools carried by the tool carrier in such a manner that the tools on the portion of the tool carrier in the curved section of the path are selectively engageable with a head bore formed in the tool holder base; means for mounting the tool magazine such that the tool magazine is movable together with the tool holder base in synchronism in the direction of axis of the spindle and in the direction perpendicular to the axis of the spindle; tool holding means provided on the tool holder base and capable of holding the tools on the tool carrier; at least one supplementary tool magazine storing a plurality of tools; and a tool exchanging means adapted to conduct an exchange of tools between the tool magazine and the supplementary tool magazine.

Other preferred forms of the invention will be explained in the following description taken in conjunction with the accompanying drawings.

DESCRIPTION OF THE PREFERRED EMBODIMENTS

Figure 1:
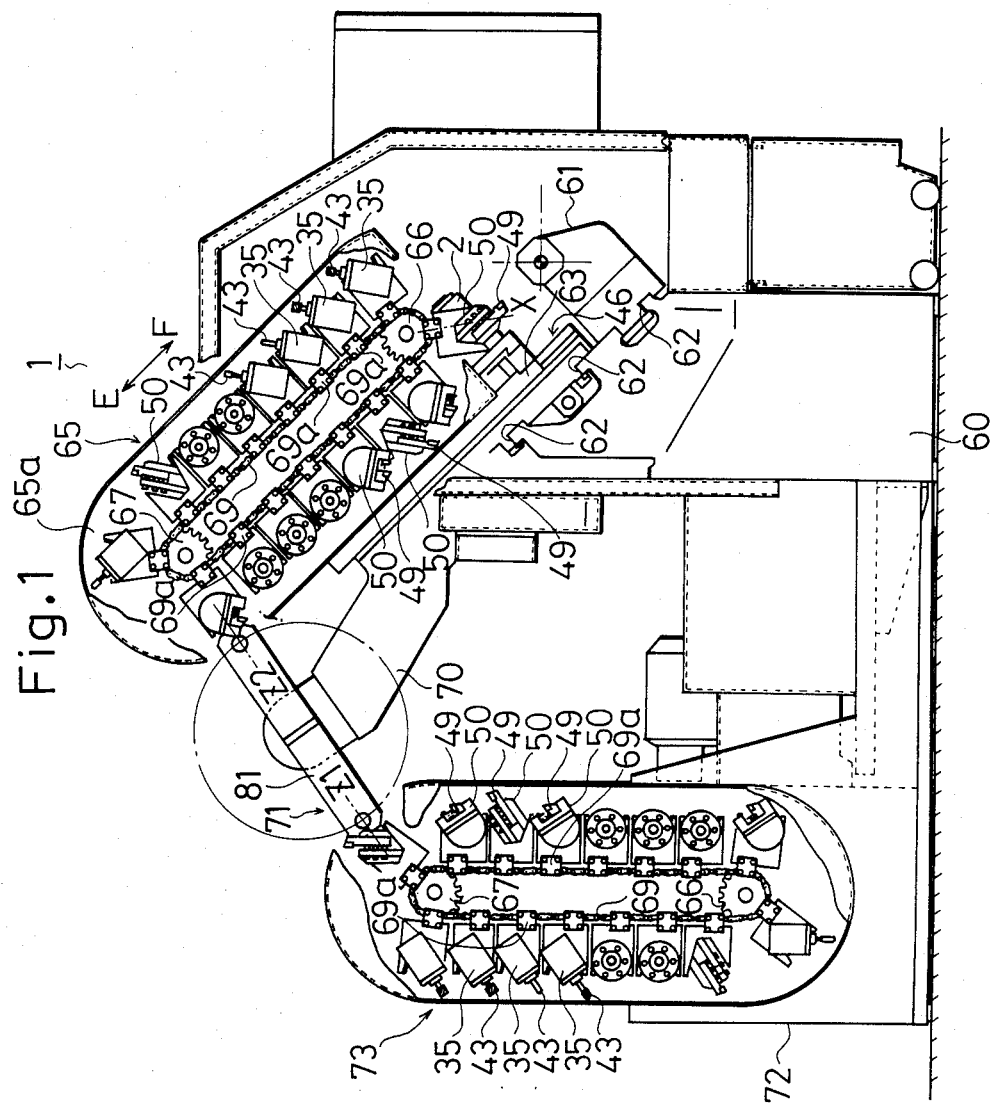
FIG. 1 is a side elevational view of an embodiment of the composite machining lathe in accordance with the invention.
Figure 2:
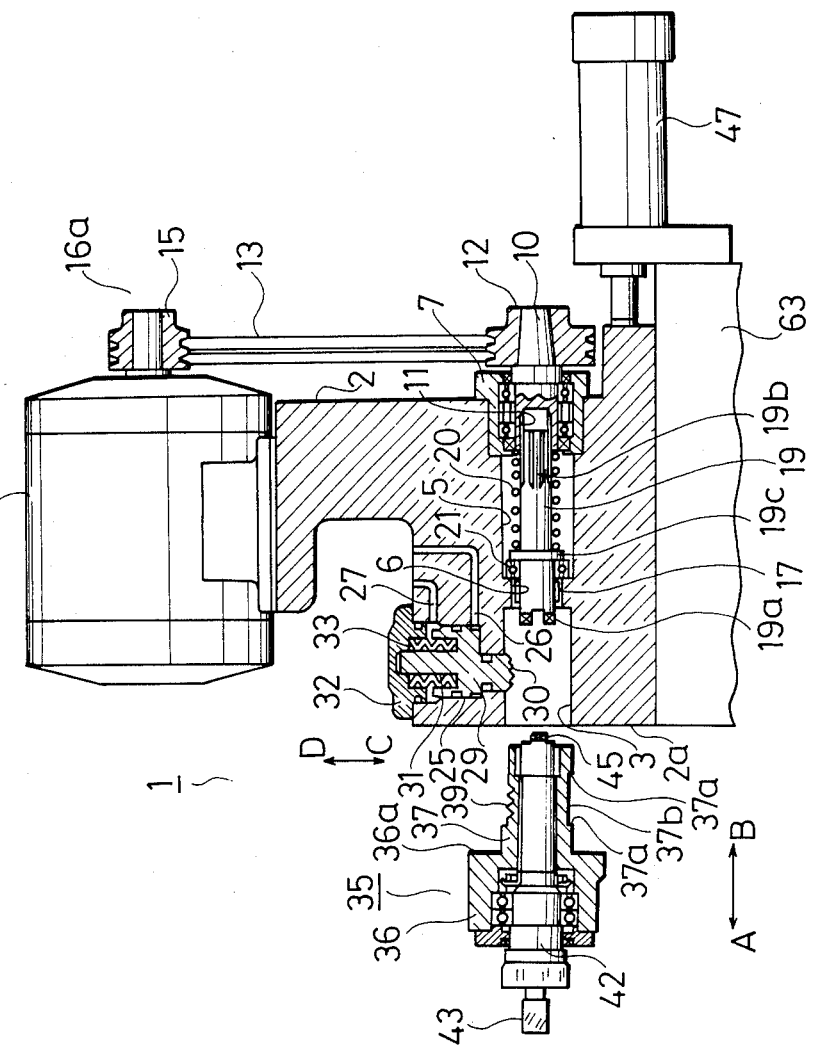
FIG. 2 is a sectional front elevational view of a tool holder base in the lathe as shown in FIG. 1.

Referring to FIG. 1, a composite machining lathe in accordance with a first embodiment of the invention is generally designated by a reference numeral 1. The lathe 1 has a tail stock 61 and a carriage 46 which are slidable in the direction perpendicular to the plane of FIG. 1, i.e., in the directions of arrows A and B shown in FIG. 2 along a guide rail 62 which extends in the direction of the arrows A and B on a bed 60. The direction of the arrows A and B coincides with the direction of axis of the spindle and will be referred to as Z-axis direction, hereinunder. The carriage 46 carries a cross slide 63 movable in a direction perpendicular to the Z-axis direction. The direction of movement of the cross slide, shown by arrows E and F in FIG. 1, will be referred to as X-axis direction, hereinunder. The cross slide 63 is provided with a tool holder base 2 which is provided with a cylindrical head bore 3 and a shaft bore 5 coaxial with each other as shown in FIG. 2. The head bore 3 and the shaft bore 5 are connected to each other through an intermediate bearing bore 6 coaxial therewith. A pulley shaft 10 is rotatably supported by a bearing on a bearing holder 7 which in turn is fitted to the open end of the shaft bore 5. The pulley shaft 10 is provided at its one end with a splined bore 11 while the other end has a driven pulley 12 fixed thereto. The driven pulley 12 is drivingly connected through a V belt 13 to a driving pulley 15 which in turn is fixed to the output shaft 16a of the motor 16. A transmission shaft 19 is rotatably supported by a needle roller bearing 17 fitted in a bearing bore 6. The transmission shaft 19 is provided at its one end with dog clutch claws 19a and at its other end with a spline 19b. The transmission shaft 19 is further provided at its intermediate portion with a flange 19c. The spline 19b fits in the spline bore 11 in the pulley shaft 10 so that the transmission shaft 19 is slidable in the axial direction relatively to the pulley shaft 10 but not rotatable with respect to the same. The transmission shaft 19 is urged towards the head bore 3 by means of a spring 20 which is loaded between the flange 19c and the pulley shaft 10. A thrust bearing 21 is disposed between the flange 19c and the opposing axial end surface of a radially inward projection defining the bearing bore 6.

Figure 5:
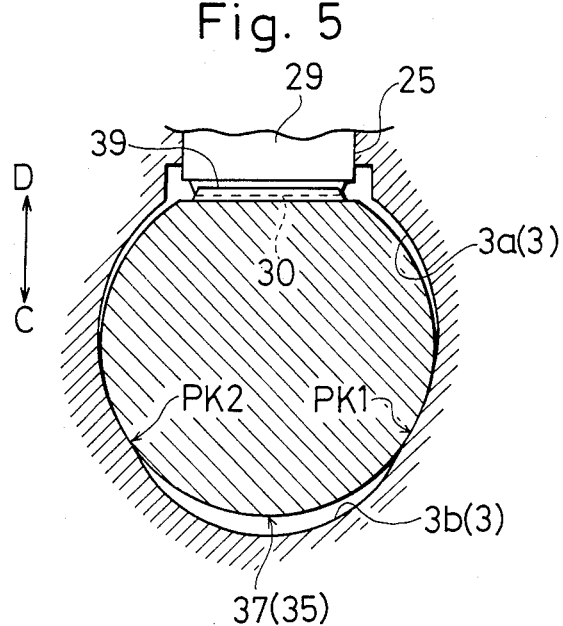
FIG. 5 is a sectional side elevational view of an engagement between a tool head and a head bore.

As will be seen from FIG. 5, the head bore 3 is composed of a circular portion 3a having a circular cross-section and a crescent-like relief portion 3b expanding outwardly from the circular portion 3a. A clamping rod 29 is slidably received by a cylinder 25 formed in the tool holder base 2 for sliding movement in the direction of arrows C and D, at a position diametrically opposing the relief portion 3b. Ports 26 and 27 are formed in both end portions of the cylinder 25. A serration 30 constituting an engaging portion is formed on one end of the rod 29, while the other end of the rod 29 is provided with a spring retainer 31. A cover member 32 is fixed to the open end of the cylinder 25. A compression spring 33 loaded between the cover member 32 and the rod 29 acts to urge the rod 29 always in the direction of the arrow C.

The tool holder base 2 carries also a motor 16. The tool holder base 2 together with the motor 16 thereon is movable over a predetermined stroke in the direction of the arrows A and B coinciding with the direction of axis of the spindle, by means of a cylinder 47 fixed to the cross slide 63.

Figure 11:
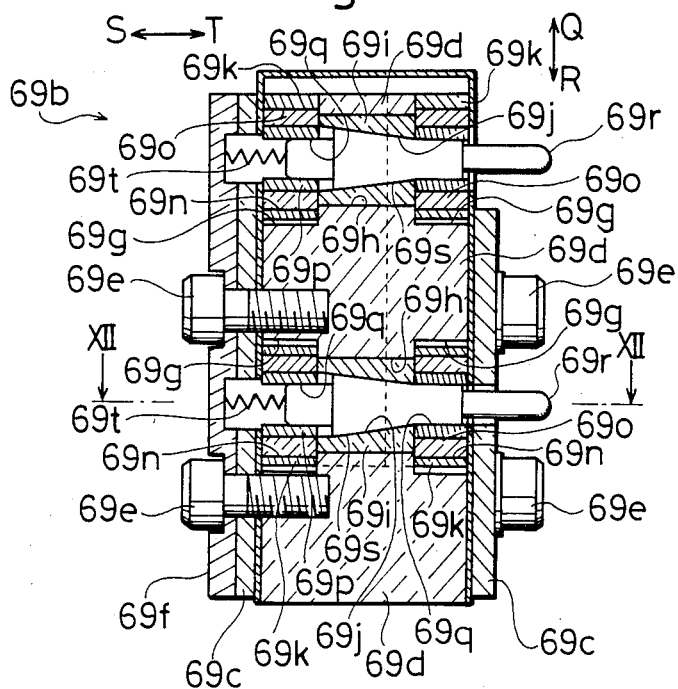
FIG. 11 is a sectional view of a tool holding unit taken along the line XI—XI of FIG. 3.
Figure 12:
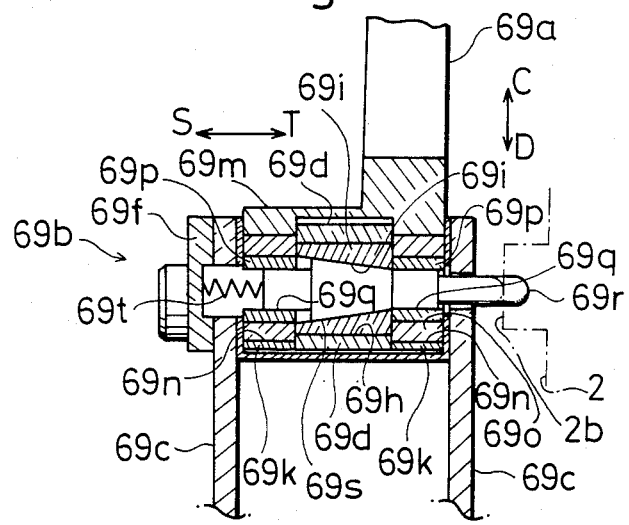
FIG. 12 is a sectional view taken along the line XII—XII of FIG. 11.

Referring again to FIG. 1, a chain-type tool magazine 65 is provided on the cross slide 63. The chain-type tool magazine 65 has two rotatable sprockets 66 and 67 and a chain 69 stretched between these sprockets 66 and 67. As will be seen from FIG. 3, tool holders 69b are attached to every predetermined numbers of links of the chain 69. Referring now to FIGS. 11 and 12, each tool holder 69b has a pair of plates 69c,69c which are mounted in parallel with the chain 69. A block 69d is fixed to the ends of the plates 69c,69c through a bolt 69e and a retainer plate 69f. The block 69d is provided with two pairs of claw mounting portions 69g,69g. Each pair of claw mounting portions 69g are connected to each other through a bore 69h. A rubber bush 69i having a tapered bore 69j fits in the bore 69h. The two pairs of, i.e., four, claw mounting portions mount a tool magazine claw 69a such that, as shown in FIG. 12, four legs 69k similar to legs of a desk formed on four corners of lower end 69m of the tool magazine claw 69a are fitted in these claw mounting portions. Each leg 69k has a bore 69n which aligns with the bore 69h. A sleeve 69p fits in the bore 69n through the intermediary of a collar 69o. A stopper pin 69r is received in a bore 69q formed in the sleeve 69p and in the tapered bore 69j, for sliding movement in the direction of arrows S and T. The stopper pin 69r is provided at its intermediate portion with a tapered portion 69s. A coiled compression spring 69t loaded between the stopper pin 69r and the retainer plate 69f always urges the stopper pin 69r always in the direction of the arrow T.

Figure 3:
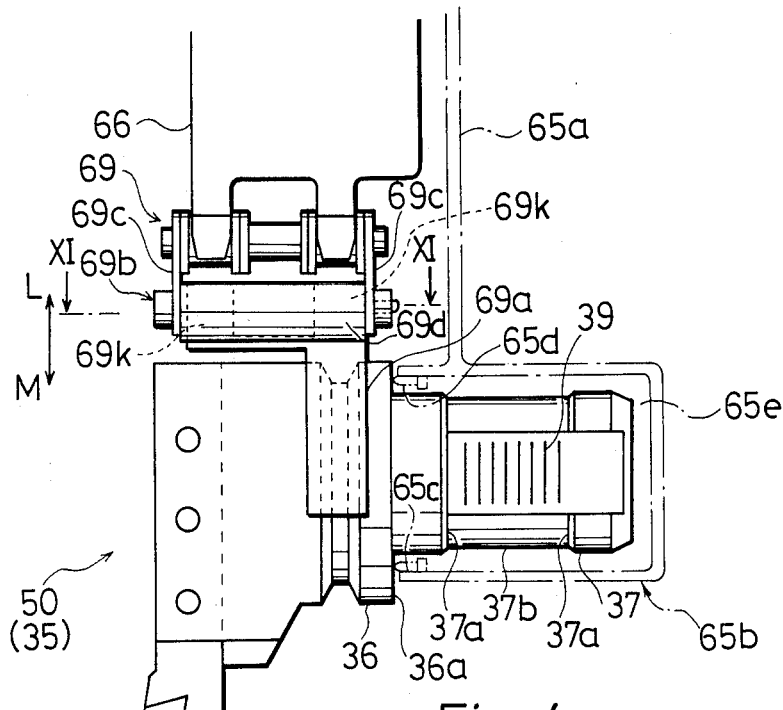
FIG. 3 is an enlarged view of a tool mounting portion in a tool magazine incorporated in the lathe as shown in FIG. 1.
Figure 4:
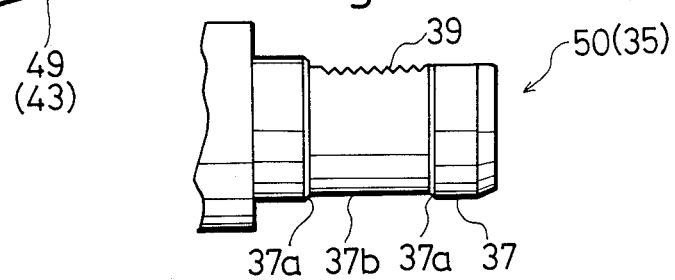
FIG. 4 is an enlarged view of a shunk of a tool.

As shown in FIG. 3, each tool magazine claw 69a carries tool heads 35,50 carrying tools 43,49 such as to be moved in the direction of arrows L and M for mounting and demounting. The tool 43 is a rotary tool such as a drill, while the tool 49 is a turning tool such as a cutting tool. The tool head 35 mounting the rotary tool is constituted by a boss 36 and a straight shank 37 as shown in FIG. 2. Referring now to FIG. 4, a serration 39 constituting an engaging portion is formed substantially on the central portion of the shank 37. As shown in FIG. 4, two stepped portions 37a are formed on the outer periphery of the shank 37. The portion 37b of the shank 37 between two stepped portions 37a,37a has a diameter which is reduced as compared with other portions. Referring again to FIG. 2, a spindle 42 is rotatably carried by the tool head 35 through a bearing. The spindle 42 carries at its one end the rotary tool 43 while dog clutch claws 45 are formed on the other end of the spindle 42.

The tool head 50 mounting the turning tool 49 also has a straight shank 37 as will be seen from FIGS. 3 and 4. A serration 39 constituting an engaging portion is formed substantially on the central portion of the shank 37. The outer peripheral surface of the shank 37 has two stepped portions 37a which are spaced from each other by a reduced-diameter portion 37b of the shank 37 having a diameter smaller than that of other portions.

Figure 8:
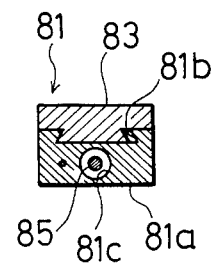
FIG. 8 is a sectional view taken along the line VIII—VIII of FIG. 7.
Figure 7:
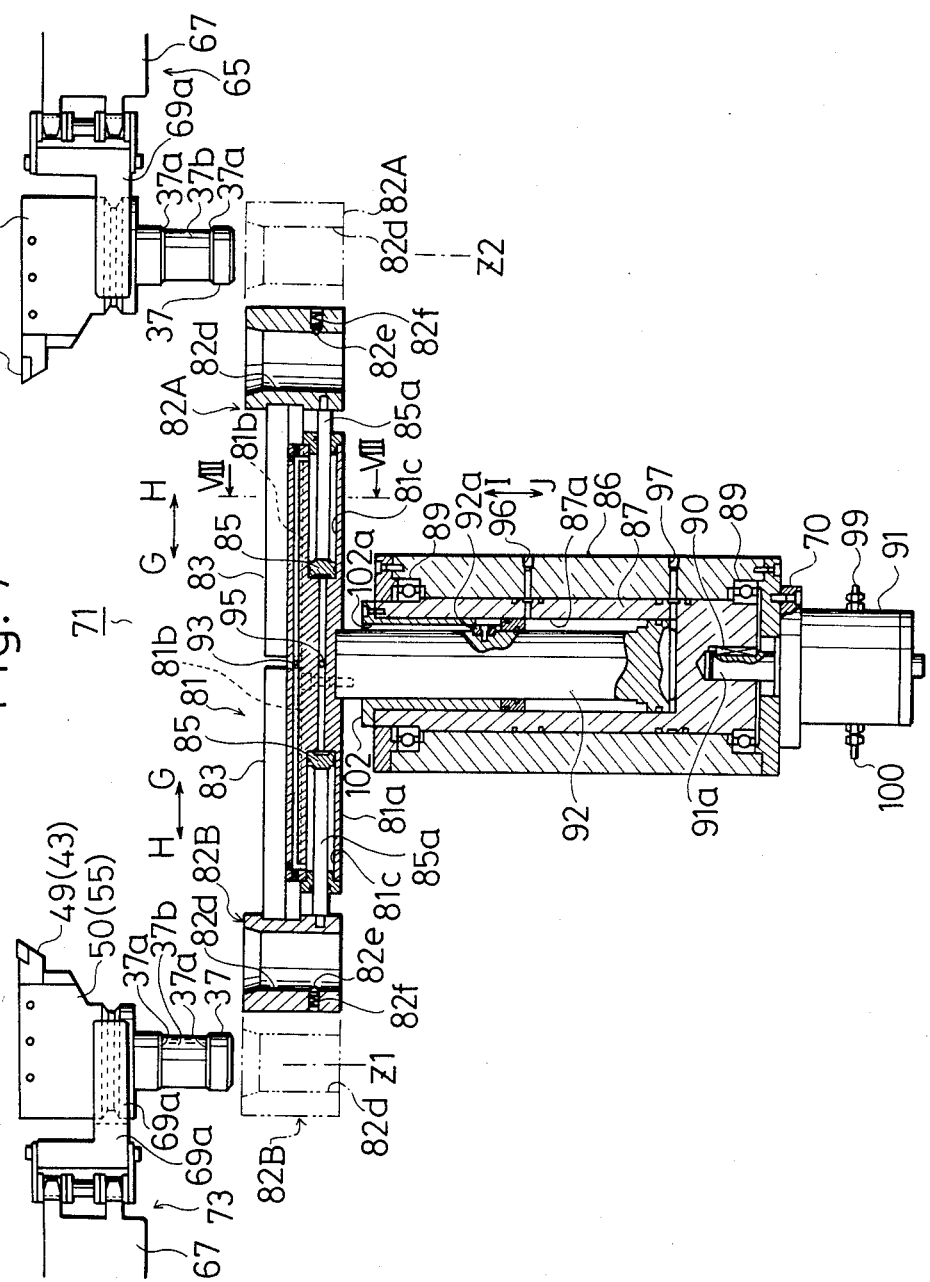
FIG. 7 is a sectional front elevational view showing the detail of the ATC device.

Referring back to FIG. 1, the carriage 46 has an arm 70 provided with an ATC arm 81 of an ATC device 71 which serves as the tool exchanging means. The ATC arm 81 is swingable over 180°. As shown in FIGS. 7 and 8, the ATC arm 81 is provided with a main part 81a having a dove-tail groove 81b. Slide arms 83,83 are held in the dove-tail groove 81b for sliding movement in the direction of arrows G and H. The main part 81a has driving pistons 85,85 which are received in cylinders 81c,81c for sliding movement in the direction of arrows G and H. The pistons 85 have piston rods 85a the ends of which are screwed to tool holding portions 82A,82B which are formed on the ends of the slide arms 83. The tool holding portions 82A,82B are provided with cylindrical holding sleeves 82d. Each holding sleeve 82d has a lock pin 82e which is biased by a coiled spring 82f inwardly of the sleeve, i.e., in the direction of the arrow G.

To the arm 70 is fixed a frame 86 which in turn carries a shaft cylinder 87 rotatably through bearings 89,89. The output shaft 91a of a hydraulic motor 91 is received in the shaft cylinder 87 through a key 90. A cylinder 87a is formed in the shaft cylinder 87. A guide bush 102 is fixed to the cylinder 87a. A key-way 102a is formed in the guide bush 102 so as to extend in the vertical direction as viewed in the Figure, i.e., in the direction of arrows I,J. A piston 92 is received in the cylinder 87a in such a manner that a key 92a which is fixed to the piston 92 is received in the key-way 102a. Thus, the piston 92 is allowed only to slide in the direction of the arrows I,J. Numerals 93,95 denote ports for supplying pressurized oil to the cylinder 81c, while 96,97 denote ports for supplying pressurized oil to the cylinder 87a. Numerals 99,100 denote ports through which pressurized oil for driving the hydraulic motor is supplied.

A supporting base 72 is provided at the left side of the bed 60 as viewed in FIG. 1. This supporting base 72 supports a supplementary tool magazine 73 having a construction identical to that of the tool magazine 65. The tool magazine 73 carries a plurality of tools 43 detachably through respective tool heads 35,50. The arrangement is such that the tools 43,49 are brought to a predetermined tool changing position Z1 as the chain 69 is driven by sprockets 66,67.

The first embodiment of the composite machining lathe in accordance with the invention has a construction explained hereinbefore. For machining a work, the cylinder 47 is activated to retract the tool holder base 2 in the direction of the arrow B in FIG. 2. The sprockets 66,67 of the tool magazine are driven in this state so that one of the tools carried by the tool magazine claws 69a on the chain 69, which is to be used in the machining, is brought to a tool indexing position X aligned with the head bore 3 in the tool holder base 2. After the tool has been moved to the indexing position X where it is aligned with the head bore 3 as shown in FIG. 2, pressurized oil is supplied through the port 26 into the cylinder 25 so as to move the clamping rod 29 backwardly in the direction of the arrow D against the resilient force of the spring 33.

The cylinder 47 is driven in this state to project the tool holder base 2 in the direction of the arrow A, so that the tool head 35 rotatably carrying the spindle 42 is moved into the head bore 3 in the holder base 2. During this operation, the dog clutch claws 19a on the transmission shaft 19 and the clutch claws 45 on the spindle 42 are made to engage each other. The movement of the tool head 35, however, is never impeded even when the claws 19a and 45 abut each other, because in such a case the transmission shaft 19 is retracted compressing the spring 20. Even when the claws 19a and 45 abut each other, these claws will mesh each other in torque-transmitting condition as the transmission shaft 19 starts to rotate.

Subsequently, the supply of the pressurized oil from the port 26 is stopped and, insteadly, the supply of oil through the port 27 to the cylinder 25 is commenced. As a result, the rod 29 is projected in the direction of the arrow C by the force which is the sum of the resilient resetting force produced by the spring 33 and the force produced by the pressurized oil supplied through the port 27, so that the serration 30 on the rod 29 is brought into engagement with the serration 39 on the straight shank 37. A further movement of the rod 29 in the direction of the arrow C causes the shank 37 to be moved, while being pressed in the direction of the arrow C, in the direction of the arrow B by the wedging action between the serrations 30,39. Then, as a result of the pressing of the shank 37 in the direction of the arrow C, the shank 37 is made to contact with the points of junction PK1 and PK2 between the circular portion 3a and the relief portion 3b of the head bore 3, so that the shank 37 is firmly gripped at three points, i.e., the junction points PK1,PK2 and the point of contact with the rod 29, and is thus stably held in the head bore 3. As a result of the movement of the shank 37 in the direction of the arrow B, the end surface 36a of the boss 36 of the tool head 35 is pressed onto the end surface 2a of the tool holder base 2 adjacent to the head bore 3 at a predetermined contact pressure. In consequence, the tool head 35 is correctly mounted and held in the right position within the head bore 3.

In the described embodiment, it is necessary that the tool heads 35,50, through which the tools 43,49 are mounted in the chain 69, are allowed to move by suitable amounts in the direction of the arrows C,D in FIG. 2, as well as in the perpendicular direction represented by arrows Q,R in FIG. 11. Namely, if such movement is not allowed, a problem is encountered during the mounting of the tools 43,49 on the tool holder base 2 that any offset of the tool head 35 or 50 from the head bore 3 causes the tool head to be pressed mainly in the direction of the arrow D by the chain 69 when the tool head is being clamped by the clamping rod 29, resulting in an offset of the tool head from the right position. Consequently, the mounting of the tools 43,49 on the correct tool position is failed disadvantageously. This problem, however, can be eliminated in the described embodiment of the invention as will be understood from the following description. Namely, when the tool holder base 2 is moved in the direction of the arrow A for clamping the tool 43,49 thereby bringing the shank 37 of the tool head 35,50 into the head bore 3, the end of the stopper pin 69r on the tool holder 69b is allowed to contact with the block 2b provided on the tool holder base 2 so that the stopper pin 69r is moved in the direction of the arrow S overcoming the resilient force of the coiled spring 69t. Consequently, the tapered portion 69s which has been held in engagement with the tapered bore 69j by the resilient force of the coiled spring 69t is disengaged from the tapered bore 69j so that a slight gap is formed between the tapered portion 69s and the tapered bore 69j. Consequently, the stopper pin 69r is allowed to move to a certain degree in the direction of the arrows C,D and in the direction of the arrows Q,R within the tapered bore 69j. This in turn permits the tool magazine claw 69a engaging with both ends of the stopper pin 69r and, hence, the tool head 35,50 held by the tool magazine claw 69a through four legs 69k to move both in the direction of arrows C,D and and in the direction of the arrows Q,R. This arrangement offers the following advantage. Namely, even if the tool head 35,50 has been moved in the direction of the arrows C,D or in the direction of the arrows Q,R during the holding of the tool head 35,50, the chain 69 does not exert any substantial force on the tool head 35,50 because the tool magazine claw 69a is allowed to move with respect to the chain 69 together with the tool head 35,50. Consequently, the tool 43,49 can be correctly mounted and held in the head bore 3.

The amount of movement of the tool magazine claw 69a caused by the movement of the stopper pin 69r in the direction of the arrow S may be as small as that just enough to compensate for the offset of the toolhead 35,50 from the head bore 3, i.e., just enough to avoid application of any force to the tool head 35,50 in the directions of arrows C,D and Q,R during the mounting of the tool head 35,50 onto the head bore 3.

In the ordinary state before the contact of the stopper pin 69r with the block 2b, the stopper pin 69r is biased by the resilient force of the coiled spring 69t in the direction of the arrow T, so that the tapered portion 69s of the stopper pin 69r is held in close contact with the wall of the tapered bore 69j. Therefore, the tool magazine claw 69a and, hence, the tool head 35,50 is securely held on the chain 69 and do not move in the direction of the arrows C,D nor in the direction of the arrows Q,R. The bush 69i is made of an elastic material such as rubber so that the tool head 35,50 is resiliently supported on the chain 69. This arrangement permits the tool magazine claw 69a to move slightly both in the directions of arrows C,D and Q,R, relatively to the chain 69. Therefore, when the tool head 35 is moved into the head bore 3, the tool head 35 can move, although slightly, in both directions of the arrows C,D and Q,R thanks to the elastic deformation of the bush 69i, even before the tool head 35 is perfectly freed as a result of the movement of the stopper pin 69r in the direction of the arrow S. With this arrangement, in the described embodiment of the invention, it is possible to smoothly mount the tool head 35,50 on the tool holder base 2 without applying any abnormal force to the chain 69.

The motor 16 is started after the mounting of the tool 43,49 on the tool holder base 2. The torque of the motor 16 is transmitted to the spindle 42 through the driving pulley 15, V belt 13, driven pulley 12, pulley shaft 10, transmission shaft 19 and the clutch claws 19a,45, thereby rotating the rotary tool 43 on the spindle 42 thus performing the required machining.

The machining is conducted while the tool head 35 is mounted on the chain 69 of the chain-type tool magazine 65. This, however, does not cause any problem such as an interference with an adjacent tool head, for the reason explained hereinbelow. Namely, since the indexing position X is located within the area where the chain 69 is flexed turning around the sprocket 66 to run along an arcuate path, the adjacent tool holders 35,50 on the chain 69 are moved apart from each other circumferentially to provide a greater distance therebetween in the indexing position X than in the straight section of the chain 69. Therefore, although the machining is conducted while the tool head 35 is on the chain-type tool magazine 65, no interference is caused between two adjacent tools on the chain 69 nor between the work and the adjacent tool on the chain 69.

After the machining, the motor 16 is stopped and pressurized oil is supplied into the cylinder 25 through the port 26 thereby to retract the clamping rod 29 in the direction of the arrow D and, in addition, the tool holder base 2 is retracted in the direction of the arrow B by the action of the cylinder 47. Consequently, the tool head 35 is extracted from the head bore 3 together with the tool 43.

Then, the sprockets 66,67 are driven without delay so so as to bring the tool to be used for the next machining to the indexing position X, i.e., a tool selecting operation is conducted in the tool magazine 65. This tool selecting operation can be made smoothly because the tool holder base 2 has been retracted in the direction of the arrow B.

Figure 6:
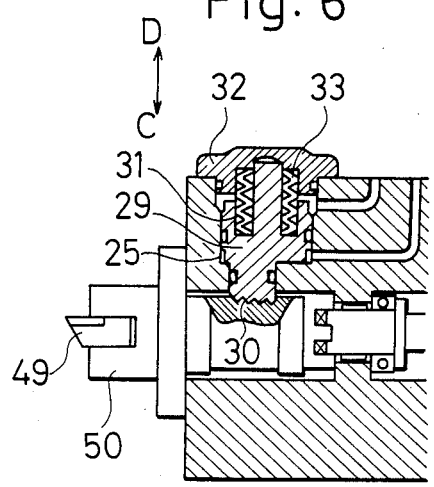
FIG. 6 is a sectional front elevational view of a tool holder base carrying a turning tool.

Although in the foregoing description the tool head 35 having the spindle 42 is selected and mounted in the tool holder base 2, it will be clear to those skilled in the art that the same operation can apply also to the case where the tool head 50 having the turning tool 49 is selected as shown in FIG. 6.

Thus, tools 43,49 in the tool magazine 65 are successively transferred into the tool holder base 2 so as to effect various types of machining. Because of a wide variety of shapes and size of the work, as well as the kinds of machining to be performed, it is quite conceivable that a desired machining cannot be performed by any one of the tools prepared in the tool magazine 65. In such a case, a tool suited to such a machining is picked up from the supplementary tool magazine 73 in a manner explained hereinunder. To this end, before commencing the desired machining, the carriage 46 is moved in the direction of arrows A,B, while the cross slide 63 is moved in the direction of the arrows E,F, such as to locate the tool magazine 65 on the cross slide 63 at the predetermined tool changing position. Then, the sprockets 66,67 of the tool magazine 65 are driven to drive the chain 69 so as to bring the tool 43 or 49 to be replaced in the tool magazine 65 to a tool changing position Z2 together with the tool head 35 or 50. Similarly, the sprockets 66,67 of the tool magazine 73 are driven to drive the chain 69 thereby bringing the tool 43 or 49 to be delivered from the tool magazine 73 to the tool changing position Z1 together with the tool head 35 or 50.

Figure 9:
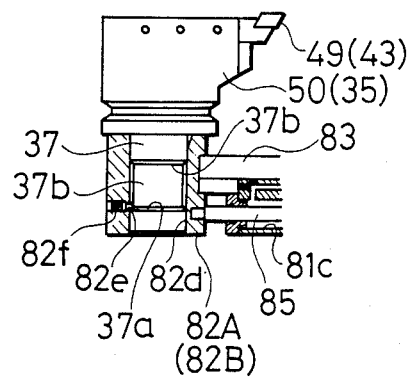
FIG. 9 is a front elevational view of a tool holding portion of the ATC device holding a tool.
Figure 10:
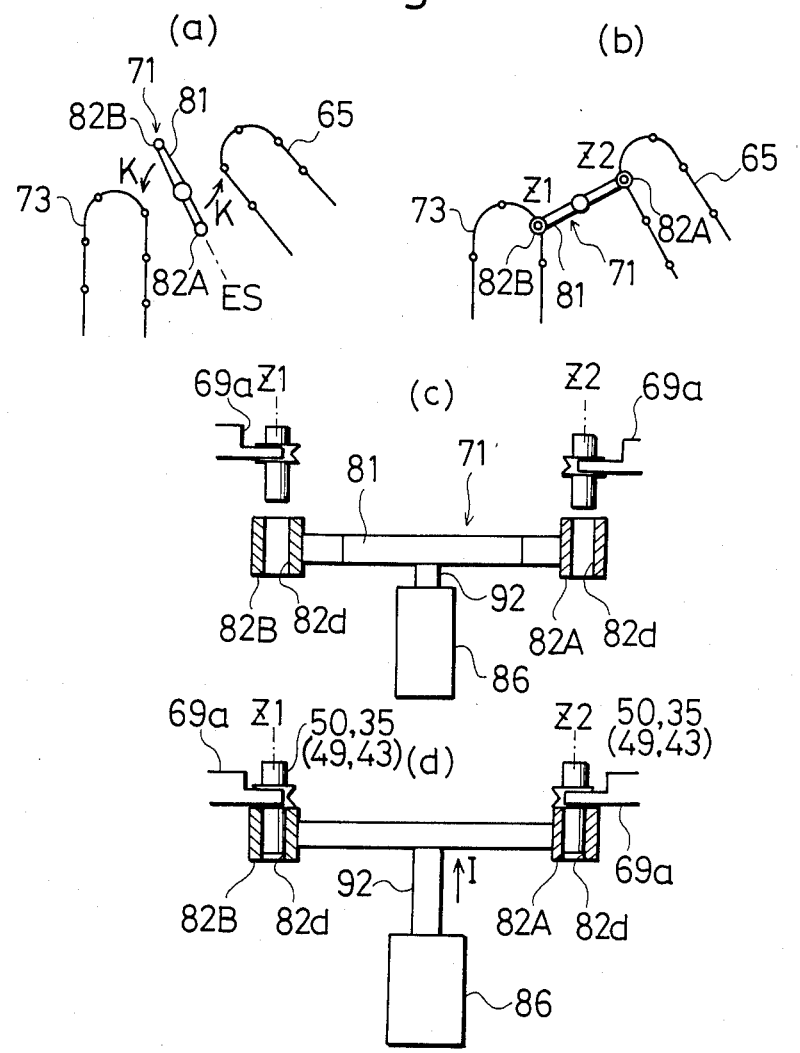
FIG. 10 is an illustration of the tool changing operation performed by the ATC device.

After the tools 43 or 49 to be exchanged have been located at respective tool changing positions Z2 and Z1, the ATC device 71 is started and the pressurized oil is supplied to the oil supply port 100 of the hydraulic motor 91, so that the output shaft 91a of the hydraulic motor starts to rotate. As a result, the shaft cylinder 87 is rotated due to the presence of the key 90. The rotation is transmitted further through the guide bush 102 and the key 92a to rotate the piston 92 by an angle equal to the angle of rotation of the output shaft 91a. In consequence, the main part 81a also is rotated together with the slide arm 83 and the tool holding portions 82A,82B in the direction of an arrow K as shown in FIG. 10a. As a result, the main part 81a and the slide arm 83 are moved from the retracted positions to a tool changing position, i.e., to a position where the tool holding portions 82A and 82B are aligned with the tool changing positions Z2 and Z1 on respective tool magazines 65 and 73. In this state, the shanks 37 of the tools 43 or 49 located at the tool changing positions Z2 and Z1 on respective tool magazines 65 and 73 are axially aligned with the holding sleeves 82d of corresponding tool holding portions 82A and 82B as indicated by imaginary lines in FIG. 7 and as shown also in FIGS. 10b and 10c. As the pressurized oil is supplied to the cylinder 87a through the port 97, the piston 92 is lifted in the direction of the arrow I together with the main part 81a fixed thereto. In consequence, the slide arm 83 and the tool holding portions 82A,82B are moved upwardly in the direction of the arrow I so that the shanks 37 of the tools 43 or 49 stationed at the positions Z2 and Z1 are moved into the holding sleeves 82d as shown in FIG. 9 and 10d. After the shunk has been fitted in the holding sleeves 82d, the lock pin 82e is brought into engagement with the reduced-diameter portion 37b of the shank 37 by the resiliency of the coiled spring 82f, whereby the tool 43 or 49 and the associated tool head 35 or 50 are prevented from accidentally dropping from the holding portions 82A,82B.

Assuming here that the holding portions 82A and 82B have been located at positions Z2 and Z1, respectively, as shown in FIG. 10c the holding portion 82A holds the tool 43 or 49 to be returned from the tool magazine 65, while the holding portion 82B holds the tool 43 or 49 to be delivered from the tool magazine 73. Pressurized oil is then supplied to the port 93 thereby to move the driving pistons 85,85 backwardly in the direction of the arrow G, so that the tools 43 or 49 in the tool holding portions 82A and 82B are extracted from the magazine claws 69a of respective tool magazines 65 and 73 as shown in FIG. 10e. Then, the pressurized oil is supplied to the supply port 99 of the hydraulic motor 91 thereby swinging the ATC arm 81 180° in the direction reverse to that explained before, so that the tool holding positions 82A and 82B are located to confront the tool changing positions Z1 and Z2, respectively, as shown in FIG. 10f. Subsequently, the pressurized oil is supplied through the port 95 so that the tool holding portions 82A and 82B are projected in the direction of arrow H through the operation of the pistons 85 and 85. As a result, as shown in FIG. 10g, the tool 43 or 49 in the tool holding position 82A is delivered to the magazine claw 69a of the tool magazine 73, the magazine claw 69a having stored the tool 43 or 49 on the tool holding portion 82B, whereas the tool 43 or 49 in the tool holding portion 82B is delivered to the magazine claw 69a of the tool magazine 65, the magazine claw 69a having stored the tool 43 or 49 on the tool holding portion 82A. That is, the tools are exchanged between the magazine claws of both tool magazines. Subsequently, the pressurized oil is supplied to the port 96 so that the ATC arm 81 is lowered together with the piston 92 in the direction of the arrow J. In consequence, the tools 43 or 49 are extracted from the holding sleeves 82d of respective tool holding portions 82A and 92B while causing the lock pins 82e to be retracted against the force of the coiled springs 82f, and are held by respective magazine claws 69a as shown in FIG. 10h.

Thus, the unnecesary tools on the tool magazine 65 are successively replaced with the new tools delivered from the tool magazine 73 to cope with the demand for new kinds of machining to be performed, by rotatingly driving the chains 69 of the tool magazines 65,73 to successively bringing the unnecessary and new tools to respective tool changing positions Z2 and Z1 while reciprocatingly swinging the ATC arm 180° between these tool changing positions.

After the completion of the replacement of desired tools, the pressurized oil is supplied again to the port 99 or 100 of the hydraulic motor 91 so as to swing the ATC arm 81 to the retracted position ES shown in FIG. 10a. Then, the carriage 46 is moved in the direction of the arrows A,B while the cross slide 63 is moved in the direction of the arrows E,F, thus preparing for the machining of the next work. Since the ATC arm 81 has been retracted to the predetermined position ES, the machining of the next work can be conducted smoothly without suffering from any interference between the tool magazine 73 and the ATC arm 81 which would impede the machining operation.

In the described embodiment, the arrangement is such that the tool holder base 2 is movable in the direction of the arrows A,B to and from the retracted position with respect to the tool magazine 65 by means of the cylinder 47. This arrangement, however, is only illustrative and any other arrangement which can cause a relative movement of the tool holder base 2 and the tool magazine 65 can be employed. For instance, the arrangement may be such that, while the tool holder base 2 is fixedly mounted on the cross slide 63, the tool magazine 65 is mounted for movement in the direction of the arrows A and B by a suitable reciprocating driving means relative to the tool holder base 2.

When the arrangement is to allow the movement of the tool magazine 65 relative to the fixed tool holder base 2, it is preferred that the portion of the housing 65a of the tool magazine 65 is provided with a dust shielding cover 65b capable of covering the shanks 37 of the tool heads 35,50 of respective tools. In the state in which the tool magazine 65 has been moved in the direction of the arrow B, i.e., in the state in which the tool 43 has been held by the tool holder base 2, the shanks 37 associated with tools 43 other than that 43 held by the tool holder base 2 are covered by the dust shielding cover 65b thereby preventing the chips or powders of the metal produced during the machining from attaching to the shanks 37. With this arrangement, it is possible to keep the shanks 37 clean to ensure a smooth sliding of the tool head 35 and 50 into and out of the head bore 3 and, hence, a highly reliable and safe tool changing operation for a long period of time.

Figure 13:
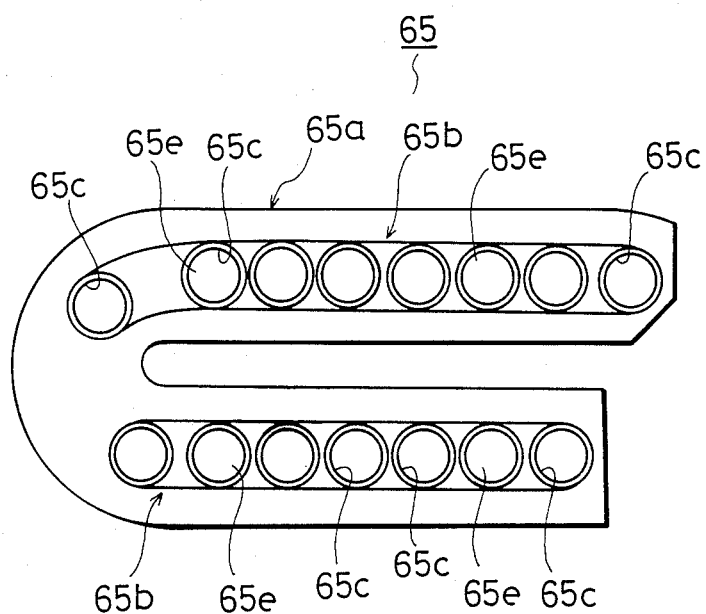
FIG. 13 is an illustration of the housing of the tool magazine.

As shown in FIGS. 3 and 13, the dust shielding cover 65b has a plurality of cylindrical insertion openings 65c corresponding to the tool heads 35,50 on the chain 69. The insertion openings 65c are provided with seal rings 65d which contact the end surfaces 36a of the bosses 36 of the tool heads 35,50 so as to seal the shanks 37 from the exterior and, at the right side of the seal rings as viewed in FIG. 3, housing chambers 65e adapted to cover the shanks 37. As shown in FIG. 13, the housing chambers 65e for insertion openings 65c shown at the upper side of this Figure and the housing chambers 65e for the insertion openings 65c shown at the lower side of this Figure are made integral. In other words, the housing chambers 65e corresponding to eight insertion openings 65c shown at the upper side of FIG. 13 are communicated with each other. And the housing chambers 65e corresponding to seven insertion openings 65c shown at the lower side of this Figure are communicated with each other.

In the described embodiment, the tool magazines 65,73 employ chains 69 which support the tool heads 35,50 mounting the tools 43,49. It will be clear to those skilled in the art, however, that any endless member driven by sprockets or pulleys, such as an endless belt, can be used as the means for supporting the tool heads 35,50 in each tool magazine.

It will be obvious also that the composite machining lathe can employ two or more supplementary tool magazines 73, although the embodiment described hereinbefore employs only one supplementary tool magazine 73. When two or more supplementary tool magazines are used, they are preferably arranged in parallel to the direction of the axis of the spindle, i.e., in the Z-axis direction.

Figure 14:
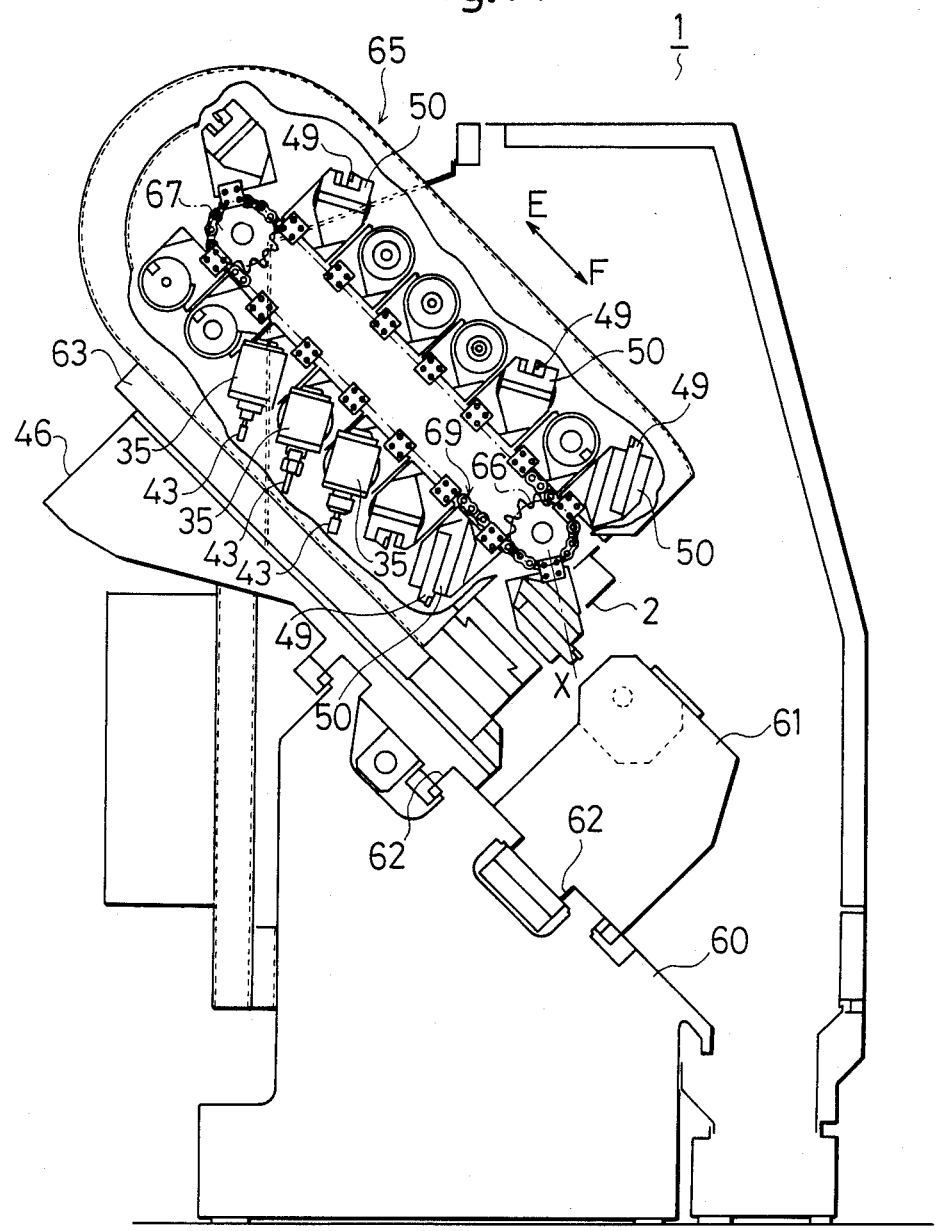
FIG. 14 is a side elevational view of another embodiment of the invention.

It is to be understood also that the provision of the supplementary tool magazine is not essential. Namely, the composite machining lathe of the invention may be devoid of the supplementary tool magazine 73, as in the case of another embodiment shown in FIG. 14. In the embodiment shown in FIG. 14, therefore, the tools are stored only in the tool magazine 65.

Furthermore, the supplementary tool magazine need not always be fixed but may be movable with respect to the lathe 1.

As has been described, the composite machining lathe of the invention is equipped with magazine 65 having a continuous elongated flexible tool carrier such as the chain 69 or a belt adapted to run along a path having a curved section. A plurality of tools 43,49 are carried by the tool carrier in such a manner that the tools 43,49 on the portion of the tool carrier in the curved section of the path such as the section around a driving sprocket 66 are selectively engageable with a head bore 3 formed in the tool holder base 2. The tool magazine 65 is mounted such as to be movable together with the tool holder base 2 in the direction of axis of the spindle, i.e., in the direction of the arrows A,B and in the direction perpendicular to the axis of the spindle, i.e., in the direction of arrows E,F, through the intermediary of a carriage 46 and a cross slide 63 and so on. The tool holder base 2 is mounted in such a manner that it is movable to and from a retracted position relatively to the tool magazine 65. Tool holding means such as clamping rods 29 are provided on the tool holder base 2 for holding the tools 43,49 on the tool carrier.

This composite machining lathe of the invention offers various advantages as follows.

Since the tools are carried by a continuous elongated flexible tool carrier adapted to run along a curved path, the adjacent tools are sufficiently spaced from each other when the portion of the carrier carrying these adjacent tools is in the curved section of the path, even if a large number of tools are densely arranged on the carrier. It is, therefore, possible to minimize the chance of interference between the tool to be used in the machining and the other tools and between the other tools and the work to be machined.

The number of the tools which can be arranged in the lathe can be increased or decreased as desired by suitably selecting the length of the tool carrier. In addition, since the tools are positioned densely in the portion of the carrier other than the portion in the curved section of the path, the size of the tool magazine 65 can be reduced advantageously.

Furthermore, various kinds of machining are performed with the tools 43,49 which are held in the tool magazine 65 mounted on the tool holder base 2. Consequently, the time duration required for the changing of the tool is remarkably shortened as compared with the conventional ATC arm type lathe which employs an ATC arm adapted to conduct a tool exchange between the tool holder base and a tool magazine separate from the tool holder base. The elimination of the ATC arm allows a reduction in size and simplification in the construction of the lathe 1.

In a preferred form of the invention, one or more supplementary tool magazine such as a tool magazine 73 storing a plurality of tools are used such that the exchange of tools is conducted between the tool magazine 65 and the suplementary tool magazine 73 by a tool exchanging means such as an ATC device 71. According to this arrangement, even when the tool magazine 65 does not have the tool necessary for the machining to be performed, the machining can be conducted by transferring the necessary tool from the supplementary tool magazine 73 to the tool magazine 65 while transferrig an unnecessary tool from the tool magazine 65 to the supplementary tool magazine 65, by the operation of the tool exchanging means. Consequently, the number of the tools employed for the machining can be increased without requiring substantial increase in the size of the tool magazine 65 on the tool holder base. In addition, the troublesome manual work of operator for resetting a new tool on the tool magazine 65 is completely eliminated thus unburdening the operator. In addition, the time required for the selection and indexing of the tool to the machining position can be minimized thanks to the reduced size of the tool magazine on the tool holder base.

Furthermore, since the tools 43,49 are held on the tool carrier through the intermediary of a resilient means such as a bush 69j, it is possible to smoothly insert the tools into the head bores 3 even when each tool is slightly misaligned with the tool holder base. By providing a disconnecting means such as the stopper pin 69r capable of temporarily freeing the tools 43,49 from the tool carrier, it is possible to avoid application of force applied by the tool carrier to the tools 43,49 and acting to impede the correct positioning of the tools during the clamping of the tools 43,49 on the tool holder base 2, thus ensuring a correct positioning of the tools 43,49 with respect to the tool holder base 2.

When the tool magazine 65 is mounted for movement in the direction of axis of the spindle with respect to the tool holder base 2, the tool magazine 65 is preferably provided with a dust shielding cover 65b capable of shielding the shanks 37 of the tools 43,49 other than the tool 43, 49 held on the tool holder base 2 from the exterior. Such a dust sheilding cover will be quite effective in preventing troubles which otherwise be caused during the mounting of the tools 43,49 on the tool holder base 2 by attaching of metal dusts and chips produced during machining to the shunks of the other tools in the tool magazine, thus ensuring a high reliability of the composite machining lathe 1.

Although the invention has been described through specific forms, it is to be noted that the described embodiments are only illustrative and not exclusive, and the scope of the invention is not limited by the description of the embodiments but by the attached claims solely. Thus, all possible changes and modifications covered by the appended claims fall within the scope of the invention.

What is claimed is:

1. A composite machining lathe comprising:

a spindle;

a tool magazine;

a tool holder base movable in the direction of an axis of the spindle;

a continuous elongated flexible tool carrier, in said tool magazine, adapted to run along a path having a curved section;

a plurality of tools carried by said tool carrier in such a manner that the shanks of each said tools are located outside of said tool carrier and said shanks on the portion of said tool carrier in said curved section of said path are selectively engageable with a head bore formed in said tool holder base;

means for mounting said tool magazine such that said tool magazine is movable together with said tool holder base in synchronism in the direction of axis of said spindle and in the direction perpendicular to said spindle axis;

means for mounting said tool holder base in such a manner that said tool holder base is movable to and from a retracted position relative to said tool magazine; and tool holding means, provided on said tool holder base, for holding the tools on said tool carrier by said shanks.

2. A composite machining lathe according to claim 1, further comprising: at least one supplementary tool magazine for storing a plurality of tools; and a tool exchanging means for exhanging tools between said tool magazine and said supplementary tool magazine.

3. A composite machining tool according to claim 1, wherein said tool carrier comprises means for carrying said tools resiliently.

4. A composite machining lathe according to claim 1, further comprising a disconnecting means, disposed between each tool and said tool carrier, for temporarily freeing said tool from said tool carrier.

5. A composite machining tool according to claim 1, wherein said tool magazine is mounted for movement in the direction of axis of said spindle with respect to said tool holder base, and said tool magazine is provided with a dust shielding cover for shielding the shanks of tools in said tool magazine from the exterior.

6. A composite machining lathe comprising:

a spindle;

a tool magazine;

a tool holder base movable in the direction of an axis of the spindle;

a continuous elongated flexible tool carrier, in said tool magazine, adapted to run along a path having a curved section;

a plurality of tools, which include a rotary tool and a turning tool, carried by said tool carrier in such a manner that the shanks of each said tools are located outside of said tool carrier and said shanks on the portion of said tool carrier in said curved section of said path are selectively engageable with a head bore formed in said tool holder base;

means for mounting said tool magazine such that said tool magazine is movable together with said tool holder base in synchronism in the direction of an axis of said spindle and in the direction perpendicular to said spindle axis;

means for mounting said tool holder base in such a manner that said tool holder base is movable to and from a retracted position relative to said tool magazine;

tool holding means, provided on said tool holder base, for holding the tools on said tool carrier by a side portion of said shanks when carried by said tool carrier; and power transmit means, provided on said tool holder base independently from said tool holding means, for transmitting torque to said rotary tool by engaging with said rotary tool when said rotary tool is held by said tool holding means.

* * * * *